(12) United States Patent
Schirm et al.

(10) Patent No.: US 9,434,001 B2
(45) Date of Patent: Sep. 6, 2016

(54) THREE-PLATE DIE CASTING TOOL HAVING A GATING SYSTEM, AND GATING SYSTEM

(75) Inventors: Wolfgang-Michael Schirm, Holle (DE); Juergen Hofmeister, Hildesheim (DE); Viktor Boeshans, Giesen (DE); Joerg Gieseke, Duingen (DE)

(73) Assignee: KSM Castings Group GmbH, Hildesheim (DE)

( * ) Notice: Subject to any disclaimer, the term of this patent is extended or adjusted under 35 U.S.C. 154(b) by 0 days.

(21) Appl. No.: 14/240,504

(22) PCT Filed: Aug. 14, 2012

(86) PCT No.: PCT/DE2012/100240
§ 371 (c)(1),
(2), (4) Date: Feb. 24, 2014

(87) PCT Pub. No.: WO2013/037358
PCT Pub. Date: Mar. 21, 2013

(65) Prior Publication Data
US 2014/0219862 A1    Aug. 7, 2014

(30) Foreign Application Priority Data

Sep. 16, 2011    (DE) .................. 10 2011 113 370

(51) Int. Cl.
*B22D 17/22*    (2006.01)
*B29C 39/26*    (2006.01)

(52) U.S. Cl.
CPC .......... *B22D 17/2272* (2013.01); *B29C 39/26* (2013.01)

(58) Field of Classification Search
CPC .................... B22D 17/22; B22D 17/2272
USPC ..................................................... 164/284
See application file for complete search history.

(56) References Cited

U.S. PATENT DOCUMENTS 6,382,302 B1    5/2002    Imwinkelried
6,634,412 B1 *  10/2003   Murray et al. ............... 164/113
(Continued)

FOREIGN PATENT DOCUMENTS

DE      1 290 672 B       3/1969
DE    10 2011 108 564 A1  11/2011
(Continued)

OTHER PUBLICATIONS

International Search Report of PCT/DE2012/100240, mailed Dec. 12, 2012.

*Primary Examiner* — Kevin P Kerns
(74) *Attorney, Agent, or Firm* — Collard & Roe, P.C.

(57) ABSTRACT

A three-plate die casting tool has a gating system, and a gating system is used in the tool. The tool includes a gating cone, at least one gating distributor channel connected with the gating cone, as well as at least one gating sprue connected with the at least one gating distributor channel. The gating cone makes a transition into at least one gating distributor channel that deflects the casting material capable of flow. The gating distributor channel opens into a kind of central gating distributor location, from which multiple gating re-distributor channels proceed, which make a transition, in each instance, into at least one, preferably only one gating sprue that deflects the casting material capable of flow. The gating sprues form the connection or the entry to the cast component.

31 Claims, 1 Drawing Sheet

(56) References Cited

U.S. PATENT DOCUMENTS 8,241,032 B2    8/2012    Klobucar et al.
2003/0041995 A1    3/2003    Nagasaka et al.

FOREIGN PATENT DOCUMENTS

| | | |
|---|---|---|
| JP | 2002-331347 A | 11/2002 |
| JP | 2008-178896 A | 8/2008 |

\* cited by examiner

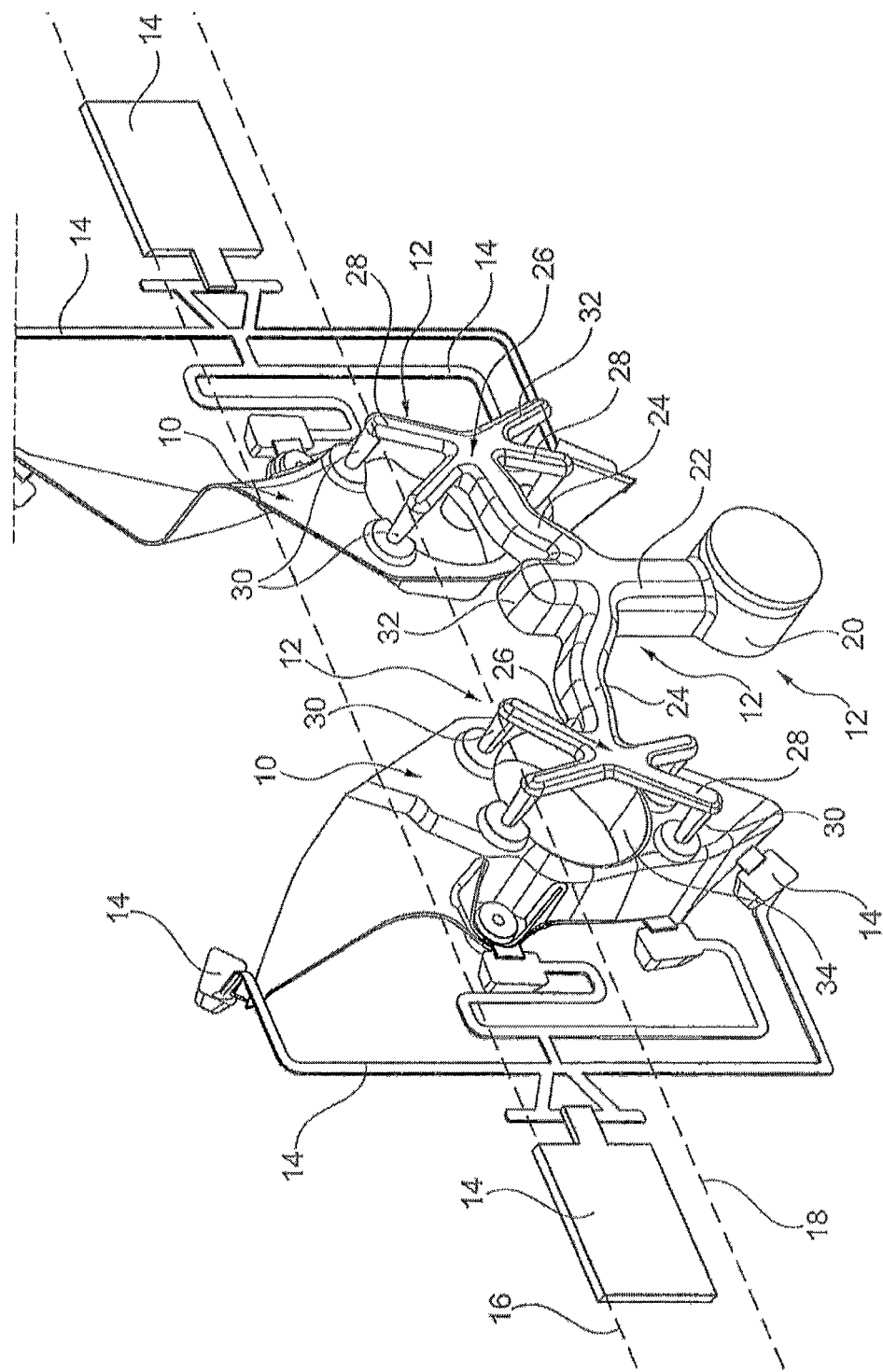

US 9,434,001 B2

THREE-PLATE DIE CASTING TOOL HAVING A GATING SYSTEM, AND GATING SYSTEM

CROSS REFERENCE TO RELATED APPLICATIONS

This application is the National Stage of PCT/DE2012/100240 filed on Aug. 14, 2012, which claims priority under 35 U.S.C. §119 of German Application No. 10 2011 113 370.8 filed on Sep. 16, 2011, the disclosures of which are incorporated by reference. The international application under PCT article 21(2) was not published in English.

BACKGROUND OF THE INVENTION

1. Field of the Invention

The invention relates to a three-plate die-casting tool having a gating system, and to a gating system.

2. Prior Art

Die-casting, which also comprises injection-molding in the broader sense, is known to be a forming method in which an amount of casting material capable of flow, coordinated with the size of the cast components, is introduced into a die-casting tool of a die-casting machine, which tool can be opened and closed.

Known die-casting machines usually have two mounting plates that lie opposite one another and stand vertically, of which one is fixed in place and the other can be driven, in movable manner, parallel to the mounting plate held in fixed manner. A tool half of the die-casting tool is mounted on each of the sides of the mounting plates of the die-casting tool that face one another. Each tool half in turn can consist of multiple tool parts. The two tool halves are divided along a vertical mold parting plane or separation plane. The tool half that is fixed in place is disposed on what is called the gating side, while the movable tool half is situated on the ejector side.

The casting mold formed by the die-casting tool or the tool halves, having a mold cavity that forms the negative contour of the cast component, is filled with casting material capable of flow, particularly with a light material, preferably with a light metal, and shaped. Subsequently, the cast component solidifies, until the cast component can be handled. After the cast component has solidified, it is removed from the mold. For this purpose, the die-casting machine moves the two tool halves away from one another. The cast component remains in the ejector side at first, and is ejected using a separate ejection apparatus.

Furthermore, the die-casting tool comprises what is called the gate or gating system, in order to accommodate the casting material capable of flow that comes from the casting chamber and is accelerated during the casting process and to which pressure is applied, and to pass it into the tool cavity. The gate, particularly its form and connection to the cast component, influences the tool filling process and thereby also the quality of the cast component.

Usually, the gate or the gating system consists of different segments. Thus, the gating system comprises the gating cone, which is also referred to as a gating bar or gating rod, furthermore one or more gating distributor channels, which are also referred to as gating channels or gating spider, and a gating sprue, the cross-section of which is called "ingate" at the entry into the cast component. For the latter, the term connection is also used.

Aside from the aforementioned die-casting tools, three-plate tools are also known. In these three-plate tools, cast component and gating system lie in different tool planes. The two tool halves, in other words the gating-side and the ejector-side half of the tool, which have already been mentioned, are separated from one another by means of an intermediate plate, which exposes a further separation plane during the tool opening movement. Because the die-casting tool can essentially be divided into three modules by means of the intermediate plate, this is referred to as a three-plate tool. The gate or the gating system of the three-plate tool is a gating system that is necessarily self-separating, which is separated from the cast component by means of the opening movement of the three-plate tool. During the opening process, the three-plate tool is first opened in the first separation plane and then in the second separation plane, so that the cast component and the gating system are separated, the latter at least in part.

SUMMARY OF THE INVENTION

Proceeding from this state of the art, the invention is based on the task of making available a die-casting tool having a gate or gating system, as well as a gate or gating system, for the production of an optimized casting component, whereby the optimization is supposed to lie essentially in the surface appearance or the surface composition, in the mechanical properties, and in the dimensional accuracy of the cast component. A further task of the invention consists in improving a die-casting tool having a gate or gating system, as well as a gate or gating system, to the effect that mold filling of the die-casting tool, particularly for the production of cast components that have an essentially rotation-symmetrical section and/or those that demonstrate material accumulations at predetermined locations and/or engine mounts, in particular, are improved qualitatively, particularly with regard to the cast component.

This task is accomplished by the characteristics of the present invention. Advantageous embodiments and further developments of the invention are also evident.

Proceeding from a die-casting tool, particularly a three-plate tool, having a gating system for accommodating and passing on a casting material capable of flow, for the production of a cast component, comprising a gating cone, one or more gating distributor channels connected with the gating cone, as well as one or more gating sprues connected with the gating distributor channel(s), it is provided, according to the invention, that the gating cone makes a transition into at least one gating distributor channel that deflects the casting material capable of flow, and that this gating distributor channel opens into a kind of central gating distributor location, from which multiple gating re-distributor channels proceed, which make a transition, in each instance, into at least one, preferably actually only one gating sprue that deflects the casting material capable of flow, whereby the gating sprues form the connection or the entry to the cast component.

With such a die-casting tool or with such a gate or gating system according to the invention, it is possible to produce a cast component having optimized properties with regard to the surface appearance or surface composition, the mechanical properties, and the dimensional accuracy. In place of a gating sprue that proceeds from the central gating distributor location, the gating re-distributor channels provided according to the invention, which proceed from the central gating distributor location previously, improve mold filling of the die-casting tool. In particular, cast components can be produced which have an essentially rotation-symmetrical section and/or demonstrate material accumulations at predetermined locations. Preferably, engine mounts that are optimized in terms of their properties can be produced with such a die-casting tool.

It can be advantageous if the at least one gating distributor channel, the gating distributor location, and the gating re-distributor channels lie essentially in one plane.

It can be advantageous if the gating cone at first makes a transition into at least one gating pre-distributor channel that deflects the casting material capable of flow, which channel then makes a transition into the at least one gating distributor channel that deflects the casting material capable of flow. A gating pre-distributor channel that deflects the casting material capable of flow away from the gating cone by about 90° is preferred. While the gating cone stands essentially perpendicular on the tool plane, the casting material capable of flow is first guided around parallel to the tool plane. From this preferably one gating pre-distributor channel, one or more gating distributor channels can now branch off, whereby preferably, a gating distributor channel is assigned to a cast component, in each instance, if multiple cast components are simultaneously cast using a die-casting tool. In the case of larger cast components, however, it can also be advantageous if multiple gating distributor channels are assigned to a cast component.

It can be practical if the at least one gating pre-distributor channel and the at least one gating distributor channel, the gating distributor location, and the gating re-distributor channels lie essentially in one plane.

It can be advantageous—as has already been explained—if a cast component is assigned to each gating distributor channel.

Thus, it can be ensured that all the cast components simultaneously cast using a die-casting tool have the same quality, whereby the gating distributor channels—if multiple ones are provided—should preferably have the same dimensions.

It can be advantageous if the gating re-distributor channels that proceed from the central gating distributor location are configured differently, or preferably having essentially the same dimensions. If they have the same dimensions, uniform mold filling can be ensured in this way. In the case of non-symmetrical cast components and cast components having non-symmetrical material accumulations, however, different dimensions of the gating re-distributor channels can also be beneficial, if applicable.

It can be practical if the gating sprue is disposed in the end region of the gating re-distributor channel.

It can be practical if at least one, preferably only one dead-end hole is provided at some, preferably at all locations of the gating system at which the casting material capable of flow experiences deflection, particularly in the region of the transition from the gating cone to the at least one gating pre-distributor channel or to the at least one gating distributor channel, in the region of the transition from the at least one gating pre-distributor channel to the at least one gating distributor channel and/or the region of the transition from the gating re-distributor channel to the gating sprue. In this way, the surface quality of the cast component can particularly be improved.

It can be advantageous, particularly for mold filling, if the central gating distributor location does not have a dead-end hole.

It can be advantageous if the gating sprues are configured in funnel shape, whereby the conically narrowed end preferably points in the direction of the cast component.

It can be practical, particularly for the cast structure of the cast component, if the gating sprues enter at those locations of the cast component that are supposed to demonstrate a greater cast material accumulation.

It can be advantageous, particularly for the cast structure of the cast component, if, in the case of a cast component having an essentially rotation-symmetrical section, the gating sprues enter in this section.

A particularly good cast structure of the cast component can advantageously be obtained if, in the case of a cast component having a rotation-symmetrical section, the gating sprues enter on the face side, preferably at the circumference of the section, spaced apart from one another uniformly or preferably non-uniformly. In the case of an engine mount having a rotation-symmetrical section, for example, a non-uniform distribution of four gating sprues has proven to be optimal.

The longitudinal axis of the gating cone can advantageously stand perpendicular on the tool plane.

The longitudinal axis of the gating sprues can advantageously stand essentially perpendicular to the tool plane.

It can be advantageous if the casting material is a light material.

For specific purposes of use, it can be advantageous if the light material is a plastic.

For certain purposes of use, it can be advantageous if the light material is a light metal.

For specific application cases, it can be advantageous if the light metal is an aluminum alloy. For certain application cases, it can be advantageous if the light metal is a magnesium alloy. For individual application cases, it can be advantageous if the light metal is a zinc alloy.

It can be advantageous if the cast component is a chassis part, particularly a cross-member, a front or rear axle subframe, a front or rear axle bracket, a cast node, a wishbone or a trailing arm.

It can be advantageous if the cast component is the pedal block of a foot lever bearing mechanism.

It can be advantageous if the cast component is a steering component, particularly a steering housing, a crash sled, a bracket, a casing tube guide, a steering wheel skeleton or a manifold for the electronic steering wheel adjustment.

It can be advantageous if the cast component is a frame structure part of a motor vehicle, particularly an A/B column, a hinge holder, a side member, a frame accommodation, a frame cast node or a muffler accommodation.

It can be advantageous if the cast component is a structural component for a motor vehicle, particularly an interior door element or a tailgate element.

It can be advantageous if the cast component is an engine component, particularly a cylinder head, a cylinder head lid or a crankcase.

It can be advantageous if the cast component is an engine support, an engine bracket, a torque support or preferably an engine mount.

It can be advantageous if the cast component is an engine periphery part, particularly an injection pump housing, an oil filter housing and lid, an oil pump housing and lid, a water connector fitting, a water pump housing and lid, a steering housing, a lead frame, a bell crank support bridge or a bearing frame.

It can be advantageous if the cast component is an oil pan.

It can be advantageous if the cast component is a transmission component, particularly an outer disk support, a piston guide, a planetary support, a slide housing, a guide wheel, a center support, a transmission drum or a transmission and intermediate housing.

It can be advantageous if the cast component is a clutch component, particularly a clutch housing or a differential housing and lid.

It can be practical if, in the case of a three-plate tool, the gating sprues are disposed in the intermediate plate.

It can be advantageous if, in the case of a three-plate tool, the gating system, with the exception of the major part of the gating sprue and, if applicable, of the gating cone, is disposed essentially in the second separation plane.

It can be advantageous if, in the case of a three-plate tool, the gating sprue is configured in such a manner that the gate or gating system tears off directly at the cast component.

However, it can also be advantageous if, in the case of a three-plate tool, the gating sprue is configured in such a manner that the gate or the gating system tears off in such a manner that the gating sprue remains standing, at least in part.

The invention furthermore relates to a gate or gating system according to the invention for use in a casting tool.

Furthermore, the invention relates to a cast component that uses a die-casting tool, preferably using a three-plate tool or uses a gate or gating system.

DETAILED DESCRIPTION OF THE PREFERRED EMBODIMENTS

Further advantageous embodiments of the invention are also evident from the following description of an exemplary embodiment according to the invention and of the related drawing. In this drawing, the single FIG. 1 shows a perspective view of two cast components 10, namely of engine mounts, with the gating system 12 according to the invention disposed on them, not yet removed, and with different overflow locations and channels 14, produced using a three-plate tool that is not shown here, for the sake of a clearer illustration. Nevertheless, the two separation planes assigned to the three-plate tool, namely a first separation plane 16 and a second separation plane 18, are indicated schematically.

The three-plate tool according to the invention, not shown here, has a gating cone 20 that stands perpendicular on the tool plane, which cone first makes a transition into a gating pre-distributor channel 22 that deflects the casting material capable of flow vertically upward, in other words parallel to the tool plane.

From this gating pre-distributor channel 22, two gating distributor channels 24 now proceed, in the manner of a "Y," deflecting the casting material capable of flow. In this connection, each gating distributor channel 24 is provided for a cast component 10.

The gating distributor channel 24 opens into a kind of central gating distributor location 26, which—as in the present case—is configured to be essentially round. Of course, the gating distributor location 26 can also have a different shape. It is advantageous if the shape is selected in such a manner that the gating re-distributor channels 28 that branch off or proceed from the gating distributor location 24 can be filled simultaneously and advantageously uniformly with casting material capable of flow. Finally, the gating re-distributor channels 28 make a transition into a gating sprue 30, in each instance that again deflects the casting material capable of flow by about 90°. In this connection, the gating sprues 30 form the connection or the entry to the cast component 10. For this purpose, the longitudinal axis of the gating sprues 30 stands essentially perpendicular to the tool plane.

It can be clearly seen that the gating pre-distributor channel 22, the gating distributor channels 24, the central gating distributor locations 26, and the gating re-distributor channels 28 lie essentially in one plane.

According to the invention, the gating re-distributor channels 28 that proceed from the central gating distributor location 26 have essentially the same dimensions, in order to ensure uniform mold filling.

Furthermore, dead-end holes 32 are provided at some locations of the gating system 12, namely where the casting material capable of flow experiences a deflection.

This is particularly the case in the region of the transition from the at least one gating pre-distributor channel 22 to the two gating distributor channels 24 and the region of the transition from the gating re-distributor channel 28 to the gating sprue 30.

The central gating distributor location 26 can advantageously make do without a dead-end hole.

The gating sprues 30 are configured in funnel shape, whereby the conically narrowed end advantageously points in the direction of the cast component 10.

The gating sprues 30 enter at the locations of the cast component 10 that are supposed to demonstrate a greater casting material accumulation; in particular, such material accumulations are provided at locations that can later serve as attachment locations on the cast component and/or are exposed to greater stress.

Furthermore, in the case of the present cast components 10, an essentially rotation-symmetrical section 34 can be seen, whereby the gating sprues enter on the face side, preferably in the region of the circumference of the rotation-symmetrical section 34, advantageously spaced non-uniformly apart from one another.

It is advantageous if the cast component 10, here an engine mount, consists of a light metal, preferably of an aluminum alloy.

In the case of the three-plate tool not shown in any detail here, the gating system, with the exception of the major portion of the gating sprues and of the gating cone, is disposed essentially in the second separation plane 18.

The invention claimed is:

1. Die-casting tool, having a gating system for accommodating and passing on a casting material capable of flow, for production of a cast component, comprising a gating cone, one or more gating distributor channels connected with the gating cone, as well as one or more gating sprues connected with the gating distributor channel(s), wherein the gating cone makes a transition into at least one gating distributor channel that deflects the casting material capable of flow, and wherein the gating distributor channel opens into a central gating distributor location, from which multiple gating re-distributor channels proceed, which make a transition, in each instance, into at least one, gating sprue that deflects the casting material capable of flow, wherein the gating sprues form the connection or the entry to the cast component, wherein the longitudinal axis of the gating cone stands perpendicular on the tool plane, and wherein the longitudinal axis of the gating sprues stands essentially perpendicular to the tool plane.

2. Die-casting tool according to claim 1, wherein the at least one gating distributor channel, the gating distributor location, and the gating re-distributor channels lie essentially in one plane.

3. Die-casting tool according to claim 1, wherein the gating cone at first makes a transition into at least one gating pre-distributor channel that deflects the casting material capable of flow, which channel then makes a transition into the at least one gating distributor channel that deflects the casting material capable of flow.

4. Die-casting tool according to claim 3, wherein the at least one gating pre-distributor channel and the at least one gating distributor channel, the gating distributor location, and the gating re-distributor channels lie essentially in one plane.

5. Die-casting tool according to claim 3, wherein the gating cone makes a transition into only one gating pre-distributor channel that deflects the casting material capable of flow.

6. Die-casting tool according to claim 1, wherein a cast component is assigned to each gating distributor channel.

7. Die-casting tool according to claim 1, wherein the gating re-distributor channels that proceed from the central gating distributor location are configured differently.

8. Die-casting tool according to claim 7, wherein the gating re-distributor channels that proceed from the central gating distributor location are configured having essentially the same dimensions.

9. Die-casting tool according to claim 1, wherein the gating sprue is disposed in the end region of the gating re-distributor channel.

10. Die-casting tool according to claim 1, wherein at least one dead-end hole is provided at some locations of the gating system at which the casting material capable of flow experiences deflection.

11. Die-casting tool according to claim 10, wherein at least one dead-end hole is provided at all locations of the gating system at which the casting material capable of flow experiences deflection.

12. Die-casting tool according to claim 10, wherein only one dead-end hole is provided, in each instance, at the locations of the gating system at which the casting material capable of flow experiences deflection.

13. Die-casting tool according to claim 10, wherein the locations are provided in the region of the transition from the gating cone to the at least one gating pre-distributor channel or to the at least one gating distributor channel, in the region of the transition from the at least one gating pre-distributor channel to the at least one gating distributor channel and/or the region of the transition from the gating re-distributor channel to the gating sprue.

14. Die-casting tool according to claim 1, wherein the central gating distributor location does not have a dead-end hole.

15. Die-casting tool according to claim 1, wherein the gating sprues are configured in funnel shape.

16. Die-casting tool according to claim 15, wherein the conically narrowed end of the gating sprues configured in funnel shape points in the direction of the cast component.

17. Die-casting tool according to claim 1, wherein the gating sprues enter at the locations of the cast component that are supposed to demonstrate a greater cast material accumulation.

18. Die-casting tool according to claim 1, wherein in the case of a cast component having an essentially rotation-symmetrical section, the gating sprues enter in this section.

19. Die-casting tool according to claim 18, wherein in the case of a cast component having a rotation-symmetrical section, the gating sprues enter on the face side of the section, spaced apart from one another uniformly or non-uniformly.

20. Die-casting tool according to claim 19, wherein the gating sprues enter on the face side, at the circumference of the section.

21. Die-casting tool according to claim 1, wherein the casting material is a light material.

22. Die-casting tool according to claim 21, wherein the light material is a plastic.

23. Die-casting tool according to claim 21, wherein the light material is a light metal.

24. Die-casting tool according to claim 23, wherein the light metal is an aluminum, zinc or magnesium alloy.

25. Die-casting tool according to claim 1, wherein the cast component is an engine support, an engine bracket, a torque support or an engine mount.

26. Die-casting tool according to claim 1, wherein the die-casting tool is a three-plate tool.

27. Die-casting tool according to claim 26, wherein in the case of the three-plate tool, the gating sprues are disposed in the intermediate plate.

28. Die-casting tool according to claim 26, wherein in the case of the three-plate tool, the gating system, with the exception of the major part of the gating sprues and of the gating cone, is disposed essentially in the second separation plane.

29. Die-casting tool according to claim 26, wherein in the case of the three-plate tool, the gating sprue is configured in such a manner that the gate or gating system tears off directly at the cast component.

30. Die-casting tool according to claim 26, wherein in the case of the three-plate tool, the gating sprue is configured in such a manner that the gate or the gating system tears off in such a manner that the gating sprue remains standing, at least in part.

31. Die-casting tool according to claim 1, wherein gating re-distributor channels make a transition, in each instance, into only one gating sprue that deflects the casting material capable of flow.

* * * * *